United States Patent Office 3,408,267
Patented Oct. 29, 1968

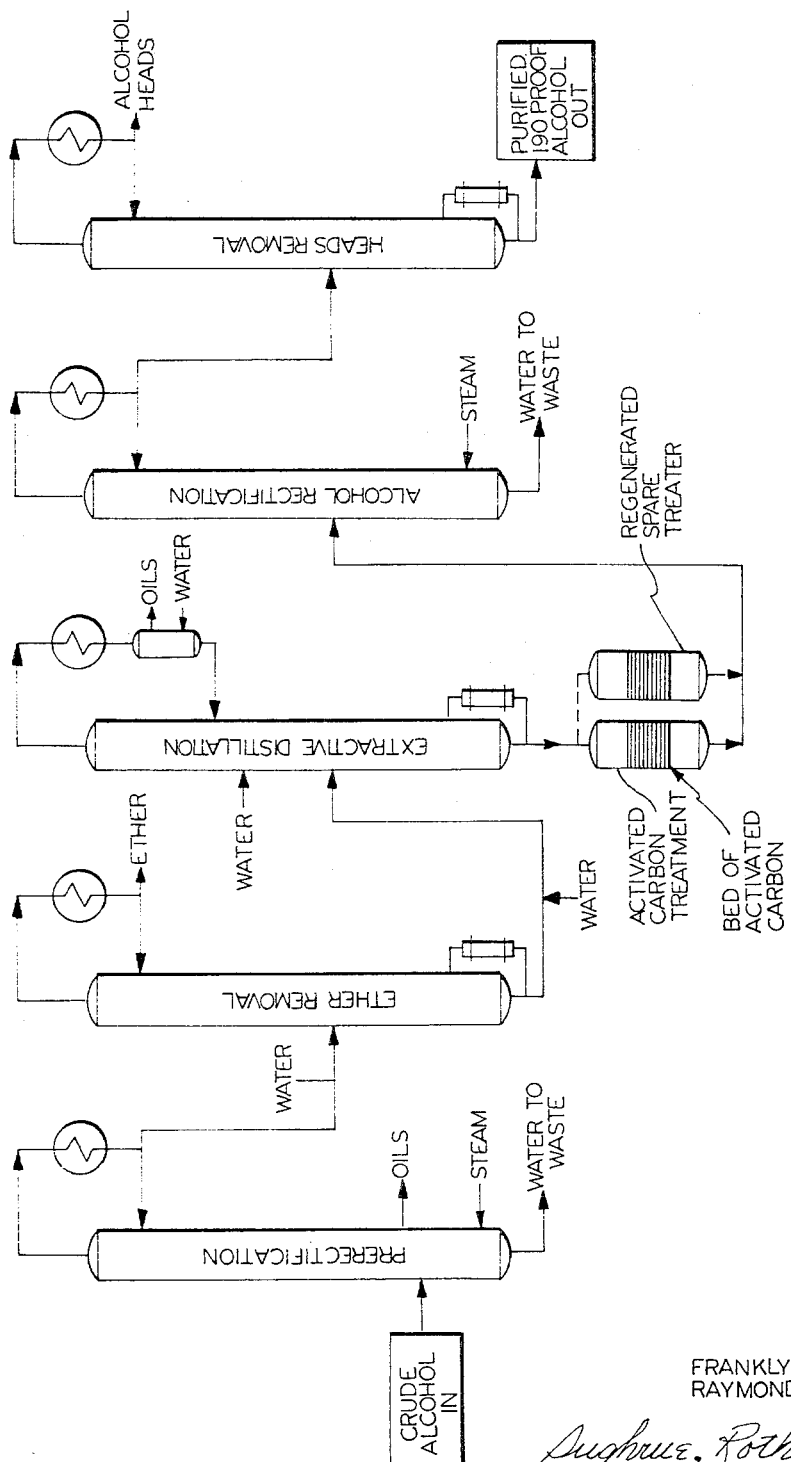

3,408,267
EXTRACTIVE DISTILLATION OF ETHANOL FOLLOWED BY ACTIVATED CARBON TREATMENT
Franklyn D. Miller, Cincinnati, Ohio, and Raymond A. Kolbeson, Tuscola, Ill., assignors to National Distillers and Chemical Corporation, New York, N.Y., a corporation of Virginia
Filed Jan. 17, 1966, Ser. No. 520,899
12 Claims. (Cl. 203—19)

ABSTRACT OF THE DISCLOSURE

The purification of crude ethyl alcohol prepared by the hydration of olefins by extractively distilling the crude alcohol and treating the ethanol-containing bottoms fraction with activated charcoal prior to the final rectification step whereby purified alcohol is obtained as an overhead fraction.

---

This invention relates generally to a novel, commercial process for the refining and purification of crude aliphatic alcohols. More specially, this invention relates to a process whereby an impure aliphatic alcohol produced by the hydrogenation of mono-olefins is conveniently processed to remove malodorous impurities and impurities which tend to undergo thermal decomposition during normal distillation operations and form malodorous substances. In particular, this invention relates to a process for removing malodorous and malodorous-forming substances present in ethanol, obtained from the hydration of ethylene prior to the rectification of the ethanol.

By the catalyzed hydration of olefins is meant those processes in which the mono-olefins are hydrated in the presence of a catalyst, including both the acid catalyzed processes wherein mono-olefins and mixtures thereof are hydrated in the presence of polybasic mineral acid-acting acids such as sulfuric acid, phosphoric acid, and benzene-sulfonic acid, and those processes, of the direct hydration type, in which the olefin is hydrated in the presence of solid or supported catalysts utilizing acids such as phosphoric acid, phosphoric acid-tungsten oxide and the like. The most common commercial process is one in which ethylene is absorbed in strong sulfuric acid to yield an absorbate containing monoethyl sulfate and diethyl sulfate esters. Said absorbate is diluted and hydrolyzed, and a crude aqueous ethanol mixture is separated therefrom.

It is well known that alcohols produced by the above outlined methods, and especially those produced by the sulfuric acid hydration of olefins, possess to a more or less degree, a distinct and foreign odor, slightly penetrating and for the most part disagreeable. Although it is not intended to ascribe the disagreeable odor of these alcohols to the presence of any one or to any particular combination of chemical compounds, it is definitely known that the odors of the crude alcohols depend largely on the quality of the starting material, such as the purity of the olefin stream employed in the olefin hydration operation. Likewise, the odor of a refined alcohol depends to a similar extent on the quality of the crude alcohol from which it is originally prepared. Thus, a rather wide range of variations in purity and odor characteristics is possible for synthetic ethanol products.

Olefin hydrocarbons, such as those produced by the cracking of mineral oils, fuel oils, kerosenes, petroleum residues, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the obnoxious odor of the crude alcohol. Although pure elemental sulfur itself has no odor, when it is present in combination with other elements, it produces powerful odoriferous agents. The bad odor of alcohols has also been at least partially attributed to the presence of the so-called polymer products of wide boiling range which are formed by side reactions during the acid catalyzed olefin hydration process. The odor of these polymerized products is further accentuated by the presence of any sulfur compounds contained therein, although the odor of some pure polymers is, by itself, somewhat unpleasant. It has been further demonstrated that abnoxious odors in some hydration alcohols can be directly attributed to the decomposition of these polymeric materials during subsequent distillation operations. It is also possible that the presence of traces of nitrogen compounds contributes to the odor of the crude alcohols.

In order to show the number and diversity of the impurities usually present in alcohols produced by catalyzed hydration processes, the following analysis is presented. This analysis was made on a sample of crude ethanol produced by the sulfuric acid hydration of ethylene, the proportions given being based on an anhydrous alcohol basis.

|  | Weight percent |
|---|---|
| Ethanol | 88.0 |
| Ether | 11.10 |
| Ketones | Trace |
| Hydrocarbons | 0.45 |
| Higher alcohols | Trace |
| Sulfur compounds | p.p.m. as sulfur__ 300 |
| Polymer materials | 0.45 |
| Misc. impurities such as aldehydes | Trace |

A typical ASTM standard distillation of a sample of the polymer materials fraction, resulting from the production of ethanol by the sulfuric acid hydration of ethylene, is as follows:

|  | Temp., ° F. |
|---|---|
| Initial boiling point | 221 |
| 5% | 412 |
| 10% | 419 |
| 20% | 428 |
| 30% | 435 |
| 40% | 441 |
| 50% | 450 |
| 60% | 459 |
| 70% | 469 |
| 80% | 490 |
| 90% | 512 |
| 95% | 545 |
| End point recovery—96% | 558 |

Thus, regardless of exact causes, it has been found that the crude ethanol produced by the sulfuric acid hydration of ethylene contains malodorous impurities which are peculiar to products from the hydration process, including water, ethers, aldehydes, ketones, other higher alcohols, hydrocarbons, sulfur and nitrogen compounds, and various polymer oils having more or less complex chemical structures.

A process for refining and purifying crude aqueous ethanol produced by the hydration of ethylene with sulfuric acid has been described in U.S. Patent No. 2,801,210. According to the process described in said patent the total crude ethanol stream, containing lower boiling impurities, including diethyl ether, and higher boiling impurities, including malodorous organic impurities boiling both above and below ethanol, and unstable polymeric oils which undergo decomposition under normal distillation conditions to produce other malodorous substances, is passed into a fractional distillation zone to obtain from the upper portion of said zone lower boiling impurities including substantially all of the diethyl ether and from the lower portion of said zone a liquid aqueous ethanol fraction. The ether-free aqueous ethanol fraction is passed into a phase separation zone wherein phase separation takes place, yielding a non-aqueous upper layer containing a major portion of the organic malodorous impurities and a lower aqueous ethanol layer. The aqueous ethanol layer is then passed through a fractional extractive distillation zone wherein some oils and impurities are removed to yield partially purified ethanol. The partially purified ethanol from the fractional extractive distillation zone is rectified and from 0.5 to 10 percent by weight of the feed stream entering the rectifier is removed as an upper portion containing essentially all of the volatile impurities including substantially all of the malodorous substance. The lower portion from the rectifier contains purified, substantially odor-free ethanol.

While the refining and purification of the ethanol according to the process described above produces a highly purified alcohol which is substantially odor-free and is useful in the chemical, pharmaceutical and vitamin industries, some traces of odor remain which make the alcohol then produced unsuitable for such purposes as various types of aerosol sprays, cosmetics, perfumes, food flavoring, etc.

It is an object of the invention to provide an effective process by which odor-producing and potential odor-producing substances are removed from alcohols produced by the hydration of olefins. It is a further object of this invention to provide an aliphatic alcohol, particularly ethanol, which is free from odor.

In accordance with the present invention, the alcohol, before final rectification is treated with activated carbon to remove contaminants such as heavy polymer oils, malodorous substances, and potential odor-producing substances. Preferably, the crude alcohol from the monoolefin hydration is subjected to the treatment with activated carbon after it has been first treated to remove therefrom diethyl ether and then put through a fractional extractive distillation zone in which further purification occurs. It is also possible to omit the preliminary ether removal step or any other treatment of the crude ethanol prior to extractive distillation and still accomplish the purposes of this invention. For example, the crude aqueous ethanol feed stream, with or without a phase separation step, may be passed directly to the extractive distillation column. The extraction distillation bottom containing the desired ethanol product is passed through the activated carbon to remove residual unstable oils and then further treated in at least one rectifying column or concentrating column to recover an ethanol product characterized by an outstanding odor rating. It will be further understood, however, that any one of the known pretreatment steps such as prerectification, ether removal and phase separation, may also be employed prior to passing the crude aqueous ethanol feed to the extractive distillation zone.

The prerectification step, which can be carried out either prior or subsequent to ether removal, removes a major portion of the high boiling impurities and particularly those which are thermally unstable and which will undergo decomposition and degradation upon heating to produce malodorous products boiling below ethanol. Consequently, the preliminary rectification of the dilute alcohol feed stream removes higher boiling impurities which cannot be completely removed by water extractive distillation. The specific operating conditions of such a preliminary rectification step will be set forth hereinafter in connection with the preferred embodiment of this invention. As previously discussed, the ether removal step also involves distillation of the alcohol feed stream to remove overhead lower boiling impurities and especially diethyl ether prior to the extractive distillation step.

Following the ether removal step and with or without the preliminary rectification step, the crude aqueous alcohol stream may be passed into a phase separator wherein it is further diluted with water from 20 to 60 weight percent ethanol and preferably from 30 to 45 weight percent ethanol. The temperature in the decanter can be allowed to vary from 25° to 225° F. but is preferably controlled to 75° to 150° F. Since the solvent diethyl ether has been removed, a sharp separation is obtained between a major portion of the polymer oils and the aqueous alcohol layer. An oil layer comprising a further portion of the polymer oil impurities including some malodorous materials is removed from the phase separator as an upper layer. The aqueous ethanol layer, now relatively free of odor bearing impurities but containing a part of the original thermally unstable polymeric oils which tend to decompose during later distillation operations, is withdrawn as a lower layer.

Following the preliminary purification steps, if any, and the extractive distillation step, the dilute aqueous alcohol is subjected to treatment with activated carbon bypassing the alcohol through a column containing the carbon which is preferably arranged in beds. Any grade of activated carbon such as charcoal or any activated carbon prepared from coconut, other nut shells, coal, pulp mill residues, petroleum-based residues, or various types of wood, and which are activated by the usual commercial methods such as high temperature treatment with steam or air, may be used. In carrying out the process of the invention, it is desirable to have a pair of columns for the treatment with the activated carbon. This enables one to reactivate the carbon in one column while the other column is in use. The regeneration and/or reactivation of the carbon may be carried out by customary methods such as, for example, by heating the carbon to a high temperature and passing steam under pressure over the carbon or by successively heating and cooling the carbon under vacuum.

After treatment with the activated carbon the alcohol stream is then preferably passed into a rectifying column wherein the alcohol is concentrated and recovered as an overhead fraction. It has previously been found that if any residual high boiling impurities and especially polymer oils are present, even in small amounts, in the alcohol stream which is introduced into this rectifying column, they will undergo thermal degradation and decomposition yielding low boiling polymer oils, sulfur containing materials, and partially oxygenated organic compounds. Since these contaminants will now have lower boiling points, they are readily carried overhead along with the desired alcohol product and will obviously contribute to any ordor characteristics. Since an alcohol having even the faintest unpleasant odor will not be accepted by certain industries, it has been found desirable to further treat the overhead alcohol product to eliminate the possibility of obtaining an alcohol product with unpleasant odor characteristics. In general, this further treatment comprises passing the overhead alcohol stream into a stripping zone in which a controlled amount of volatile material is continuously removed as a heads fraction. This heads stripping step will also be described hereinafter in greater detail in connection with the preferred embodiment of this invention. The alcohol product free from odor will be obtained in accordance with the process of this invention as the bottoms stream from the heads stripping column.

The present invention will be more fully understood by reference to the following preferred embodiment and to the drawing which is a schematic diagram of the recovery process, wherein the feed stream is a synthetic crude aqueous ethanol, produced by the hydration of an ethylene stream with sulfuric acid, containing from about 0.1 to .2% by weight of polymer oils, from about 3 to 20% by weight of diethyl ether, and from about 12 to 60% by weight of water.

The crude ethanol stream is initially subjected to preliminary rectification in a fractional distillation column having from 40 to 60 plates as described in U.S. Patent No. 2,801,209. The temperatures within the column are controlled such that the more volatile materials, that is, components boiling up to and including essentially all of the ethanol are recovered as a fraction from the upper portion of the column. The temperature at the bottom of the column will range from about 212° to 220° F. and is preferably controlled to the boiling point of pure water at the operating pressure. At the top of the column, the temperature will range from about 170° to 180° F. The fraction removed from the upper portion of this column will contain substantially all of the ethanol, and of the diethyl ether and other volatile impurities, and some water along with a small portion of the more volatile higher boiling impurities. Concentration of the ethanol in the fraction removed will range from about 85 to 95%, and preferably from about 90 to 95% by weight. The ethanol fraction thus obtained is then passed to an intermediate point in an ether removal distillation column having 30 to 60 plates operated at a superatmospheric pressure of 5 to 20 p.s.i.g. to facilitate condensation of ether. The temperature within the column is controlled such that the temperature at the top of the column is between 120°–140° F., and at the bottom, between 200° and 220° F. The vapor stream from the upper portion of this column has the approximate composition of 98 weight percent ether, 1.5 weight percent water, together with traces of acetaldehyde and other low boiling impurities. This overhead fraction is condensed, and at least a portion removed as crude diethyl ether for further purification. Some polymer oil impurities which are more volatile than aqueous ethanol may concentrate in the removal column at a point in the vicinity of the feed plate. These impurities are preferably removed from the column as a separate stream. This impurities stream constitutes a relatively small portion of the total odor producing material in the crude ethanol.

The crude aqueous alcohol stream, substantially free of ether, is removed as a bottoms fraction and contains abount 60% ethanol, 39.5% water, and 0.5% impurities including malodorous materials. This bottoms fraction is subjected to a water extractive distillation step, as also described in U.S. Patent Nos. 2,801,209 and 2,801,210. The ethanol-containing mixture is fed to an intermediate point of a rectification column having about 45 trays. Sufficient water is added at the top of the column, or at a point above the feed plate, to reduce the concentration of ethanol in the internal reflux to 5 to 40% by weight, and preferably from about 10 to 30% by weight, in an internal reflux. The water present in the extractive distillation column raises the active boiling temperature on the trays and causes the passage upward in the column of volatile organic impurities remaining in the alcohol. These impurities along with some aqueous ethanol vapors are removed overhead. However, certain of the remaining polymeric oils including some of the sulfur and nitrogen bearing types, are not sufficiently volatile to be forced upward and out of the overhead line. These higher boiling impurities are recovered with the aqueous bottoms fraction and were found to be of the type which is subject to degradation and decomposition during subsequent distillation steps when the alcohol is concentrated and separated from the major portion of water. These higher boiling, malodorous impurities generally have boiling ranges about 400° F. but under thermal conditions of fractionation, they decompose into more volatile portions boiling at or below the temperature range of ethanol. There is consequently produced as a bottoms stream an aqueous ethanol stream containing from 3 to 20 weight percent alcohol and up to 0.2 weight percent of the high boiling decomposable malodorous impurities. For example, an aqueous bottoms stream of the following general compositions has been obtained using the above outlined purification steps.

EXTRACTIVE DISTILLATION COLUMN BOTTOMS

Ethanol _____ weight percent __ 3.0–20.0
Polymer oils _____ do ___ 0.002–0.20
Sulfur compounds _____ p.p.m. as sulfur __ 1.0–5.0
Water _____ Remainder This weak alcohol fraction is next subjected to treatment with activated carbon by pumping the stream of alcohol at a rate of 700 gallons per minute through 1,000 to 10,000 pounds of Columbia 3LC activated carbon. Preferably the temperature of the alcohol during the treatment with the activated carbon is maintained at about 150° to 240° F., and preferably about 210° to 220° F. The activated carbon is arranged in beds having a depth of about 7 feet in a tower having a height of 9 feet. The pumping is maintained at such a rate as to insure that the activated carbon is always completely covered with the alcohol. Preferably, a pair of towers is used, one being used for the treatment of the alcohol while the carbon in the other tower is being reactivated or regenerated. It will be further understood that the alcohol stream may be passed down over an activated carbon bed to achieve the desired purification.

After the treatment with the activated carbon, the sulfur content of the alcohol is reduced from 5 p.p.m. to less than 0.05 p.p.m. Ultra violet absorbance data indicates an alcohol product of extremely high purity, better than that produced by any other process.

The alcohol, after treatment with the activated carbon is subjected to concentration in the usual manner in a rectifier column. A final heads removal operation may be used to remove traces of volatile impurities which are introduced by the use of a process stream which is less pure than the high quality product obtained by this process during rectification.

The rectification following the activated carbon treatment step comprises contacting the weak alcohol in a distillation zone wherein it will undergo concentration. The temperature within the column will range from about 220° F. at the base to about 175° F. at the top of the column. The substantially purified ethanol is recovered as an overhead fraction or preferably as a top side stream from the rectifying column. Any undecomposed heavy oils which may accumulate at or near the feed plate of the rectifying column can be withdrawn from suitable side connections for further processing. As previously discussed, malodorous impurities in the ethanol product may occur as a result of the thermal degradation and decomposition of the heavy polymer oils which may be passed into the rectifying column along with the activated carbon treated extractive distillation bottoms. In order to eliminate such impurities it has been found desirable to subject the overhead ethanol fraction recovered from the rectification column to a heads stripping step. In general, the stripping step comprises feeding the ethanol fraction directly into the upper portion of a rectifying column of 20 to 40 plates. Heat is supplied by a closed steam coil or some other suitable means whereby no further water is added to the concentrated ethanol within the column. Up to about 10% by weight of the alcohol is removed as an overhead from this heads stripping zone. It is considered desirable to remove at least 0.1% of the total feed stream in this manner in order to remove any of the volatile malodorous materials which may be present in the ethanol. The preferred minimum is about 0.5% of the total feed. The bottoms stream recovered from the heads stripping column consists of the highest quality and odorless ethanol ever achieved in actual commercial operations.

It will be understood from the above description that the prior art, as exemplified by U.S. Patent No. 2,801,209 and No. 2,801,210, discloses combinations of prerectification, ether removal, extractive distillation, rectification and heads stripping operations to produce high quality alcohol such as ethanol. Although prerectification may or may not be employed in the present process, the preferred embodiment, as hereinabove described, utilizes such a step. It will be further understood that the equipment and operating conditions employed in each of these separate operations apply to the present process. In essence the present invention resides in the discovery that ethanol of an even higher purity can be achieved provided the aqueous ethanol bottoms obtained from the extractive distillation step are treated with activated carbon prior to the subsequent purification steps. The importance of the activated carbon treatment will be further demonstrated by reference to the following table wherein a series of comparative runs were carried out. In each run a crude aqueous ethanol stream was subjected to ether removal, extractive distillation, rectification and heads stripping in accordance with the above disclosure. Runs 1 and 2 were subjected to prerectification prior to the ether removal step, while in Runs 1 and 3 the extractive distillation bottoms were further treated with activated petroleum-based carbon (Columbia 3LC) prior to rectification, also as descibed above. Samples of all the runs were tested for odor characteristics by the conventional test based on the opinions of individual members of a test panel. This test is described in detail in U.S. Patent No. 2,982,757. All of the samples tested were obtained from the ethanol products recovered from the heads stripping column. It will be seen from the data in the table that the ethanol which had been subject to activated carbon treatment was clearly superior to ethanol which had undergone all of the same purification and recovery steps except for the step of treating the extractive distillation bottoms with activated carbon prior to rectification.

In order to employ a more objective test, samples of the extractive distillation bottoms were tested for ultra violet absorbance to determine the effect of the activated carbon treatment on the impurity level even prior to final rectification and heads stripping. The extent to which the ethanol sample absorbs ultra violet light is a direct measurement of impurity concentration. Thus, a higher absorbance reading is indicative of a higher concentration of impurities which absorb the ultra violet light. The absorbance readings were made at 240, 250, 260 and 280 millimicrons wave lengths. The data in the table show that the treatment of the extractive distillation bottoms with activated carbon resulted in a marked reduction in the impurity level. The data further show that the use of a prerectification step is preferred for attaining a particularly high quality ethanol product.

TABLE

| Run | Prerectification | E. D. Bottoms Carbon Treatment | Odor | U.V. (10 cm. cells) 280 | 260 | 250 | 240 |
| --- | --- | --- | --- | --- | --- | --- | --- |
| 1 | No | Yes | 1.00 | 0.188 | 0.220 | 0.245 | 0.268 |
| 2 | No | No | 1.13 | 1.64 | 5.78 | 12.08 | 14.48 |
| 3 | Yes | Yes | 1.00 | 0.002 | 0.014 | 0.057 | 0.130 |
| 4 | Yes | No | 1.06 | 1.45 | 1.78 | 2.00 | 2.23 |

While particular embodiments of this invention are shown above, it will be understood that the invention is obviously subject to variations and modifications without departing from its broader aspects.

What is claimed is:

1. In a process for refining and purifying crude aqueous ethanol which has been produced by the hydration of ethylene, said crude aqueous ethanol containing hydrocarbon oils which undergo decomposition under normal distillation conditions to produce malodorous substance, which comprises passing said crude aqueous ethanol to an extractive distillation zone, recovering an aqueous bottoms fraction containing ethanol and heavy hydrocarbon oils, and passing said aqueous bottoms fraction to at least one concentrating, fractional distillation zone to recover overhead a purified ethanol fraction; the improvement which comprises passing said aqueous bottoms fraction through activated carbon prior to being passed to said concentrating, fractional distillation zone.

2. In the process of claim 1 wherein said activated carbon is a petroleum-based residue.

3. In the process of claim 1 wherein said activated carbon is wood charcoal.

4. In the process of claim 1 wherein said aqueous bottoms fraction is passed through activated carbon at a temperature within the range about 60° to 325° F.

5. In the process of claim 1 wherein water is fed to said extractive distillation zone.

6. In the process of claim 1 wherein said crude aqueous ethanol is fractionally distilled to remove ether impurities therefrom prior to being passed to the extractive distillation zone.

7. In the process of claim 6 wherein said crude aqueous ethanol is prerectified prior to the removal of ether impurities.

8. In the process of claim 1 wherein said crude aqueous ethanol is passed to a decanting zone wherein a non-aqueous phase is separated from an aqeous ethanol phase.

9. In a process for refining and purifying crude aqueous ethanol which has been produced by the hydration of ethylene, said crude ethanol containing lower boiling impurities, including diethyl ether, and higher boiling impurities, including malodorous organic impurities boiling both above and below ethanol and unstable polymeric oils which undergo decomposition under normal distillation conditions to produce other malodorous substances, which comprises the following sequential steps:
 (a) prerectification to concentrate said ethanol,
 (b) fractionation to remove the diethyl ether,
 (c) fractional extractive distillation to remove oils,
 (d) rectification to concentrate said ethanol and to remove higher boiling impurities, and
 (e) heads stripping to remove lower boiling impurities; the improvement which comprises treating said ethanol with activated carbon subsequent to step (c) but prior to step (d) to obtain odorless, high purity ethanol.

10. In the process of claim 9 said ethanol is treated with activated carbon at a temperature within the range of about 60° to 325° F.

11. In the process of claim 9 wherein said activated carbon is a petroleum based residue.

12. In the process of claim 9 wherein said activated carbon is wood charcoal.

References Cited

UNITED STATES PATENTS

| | | | |
| --- | --- | --- | --- |
| 1,661,403 | 3/1928 | Barnebey | 203—41 |
| 2,080,111 | 5/1937 | Bump | 260—643 |
| 2,474,170 | 6/1949 | Sulzbacher | 260—643 |
| 2,556,248 | 6/1951 | Amick | 203—41 |
| 2,801,209 | 7/1957 | Muller et al. | 203—83 |
| 2,801,210 | 7/1957 | Muller et al. | 203—84 |
| 2,974,175 | 3/1961 | Watts | 260—643 |

WILBUR L. BASCOMB, Jr., *Primary Examiner.*